US006756763B2

(12) United States Patent
Kahlon et al.

(10) Patent No.: US 6,756,763 B2
(45) Date of Patent: Jun. 29, 2004

(54) SENSORLESS INDUCTION MOTOR CONTROL

(75) Inventors: Gurinder Singh Kahlon, Canton, MI (US); Ning Liu, Novi, MI (US); Robert Joseph Mohan, Canton, MI (US); Richard Eric Luken, Farmington Hills, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 140 days.

(21) Appl. No.: 10/137,594

(22) Filed: May 2, 2002

(65) Prior Publication Data

US 2003/0205983 A1 Nov. 6, 2003

(51) Int. Cl.[7] ............................ H02P 1/42; H02P 5/28; H02P 7/36
(52) U.S. Cl. ....................... 318/727; 318/700; 318/725; 318/800; 318/801; 318/814; 318/820
(58) Field of Search ................................ 318/700, 725, 318/727, 800, 801–814, 820

(56) References Cited

U.S. PATENT DOCUMENTS

| | | | |
|---|---|---|---|
| 4,023,083 A | | 5/1977 | Plunkett |
| 4,259,629 A | * | 3/1981 | Kurosawa ................... 318/807 |
| 4,442,393 A | * | 4/1984 | Abbondanti ................ 318/802 |
| 4,477,761 A | * | 10/1984 | Wolf ........................... 318/800 |
| 4,885,520 A | * | 12/1989 | Sugimoto et al. ........... 318/808 |
| 5,032,771 A | | 7/1991 | Kerkman et al. |
| 5,231,339 A | | 7/1993 | Kishimoto et al. |
| 5,294,876 A | * | 3/1994 | Jonsson ....................... 318/803 |
| 5,388,052 A | | 2/1995 | Mann |
| 5,689,169 A | * | 11/1997 | Kerkman et al. ........... 318/807 |
| 5,729,113 A | * | 3/1998 | Jansen et al. ............... 318/799 |

(List continued on next page.)

FOREIGN PATENT DOCUMENTS

| DE | 36 17 452 | 11/1987 |
|---|---|---|
| EP | 0 461 511 | 12/1991 |

OTHER PUBLICATIONS

J. Faiz, "Different Techniques for Real Time Estimation of an Induction Motor Rotor Resistance in Sensorless Direct Torque Control for Electric Vehicle", IEEE Transactions On Energy Conversion, vol. 16, No. 1, Mar. 2001, pp. 104–119.

Fitzgerald, et al., "Electric Machinery" Fifth Edition, 4–2 Introduction to AC and DC Machines, pp. 150–170, 6–2 Transformation To Direct– And Quandrature–Axis Variables, pp. 268–273, 7–2 Currents And Fluxes In Induction Machines, pp. 324–343.

*Primary Examiner*—Kimberly Lockett
*Assistant Examiner*—Tyrone Smith
(74) *Attorney, Agent, or Firm*—Brinks Hofer Gilson & Lione

(57) ABSTRACT

A method for controlling an induction motor using an equivalent circuit model, the equivalent circuit having a real component and an imaginary component, is disclosed. The method instead of measuring a plurality of induction motor parameters, the real and the imaginary component of the induction motor impedance are calculated based on the measured phase currents and voltages. The invention calculates a first control function based on the real component of the induction motor impedance, and a second control function based on the imaginary component of the induction motor impedance, and adjusts the induction motor excitation frequency until the first control function is approximately equal to the second control function. After the excitation frequency is determined, the motor torque is calculated by taking the square of motor voltage in the d-q reference frame. Working with a few control parameters, the present invention achieves a desired maximum torque or a desired peak efficiency with a high tolerance of variation in the control parameters.

23 Claims, 5 Drawing Sheets

U.S. PATENT DOCUMENTS

| | | |
|---|---|---|
| 5,739,664 A | 4/1998 | Deng et al. |
| 5,796,235 A | 8/1998 | Schrodl et al. |
| 5,796,236 A | 8/1998 | Royak |
| 5,796,237 A | 8/1998 | Yamakawa |
| 5,883,344 A * | 3/1999 | Colby et al. ............ 187/393 |
| 5,936,377 A * | 8/1999 | Blaschke et al. ......... 318/807 |
| 5,998,958 A * | 12/1999 | Lee ........................ 318/801 |
| 6,121,748 A | 9/2000 | Yamakawa et al. |
| 6,313,599 B2 * | 11/2001 | Norrkniivila et al. ..... 318/722 |
| 6,448,735 B1 * | 9/2002 | Gokhale et al. ........... 318/700 |
| 6,507,166 B2 * | 1/2003 | Maceratini et al. ....... 318/727 |

* cited by examiner

SENSORLESS INDUCTION MOTOR CONTROL

TECHNICAL FIELD

The present invention relates to systems and methods for controlling induction motors.

BACKGROUND

One of the most common methods for controlling induction motors is known in the art as indirect rotor flux orientation control. Continuous feedback of motor operation information and various motor parameters are required using this method. For example, rotor position feedback, rotor resistance and inductance are required parameters using this method. Sensor wheels and position sensors are typically used to determine rotor position. Proper slip frequency is maintained based upon rotor resistance, rotor inductance, and phase current. The motor torque can be calculated by measuring the motor current for a given condition.

This type of control methodology is simple and crude. One significant problem that arises using this method of control is that rotor resistance and rotor inductance is affected by the temperature and magnetic saturation and thus the motor performance is affected as well. Typically, however, it is assumed that rotor resistance and inductance stays constant for all conditions. This assumption is, of course, incorrect and thus the performance of the motor suffers when the rotor is hot.

While there are systems and methods for providing position sensorless control of induction motors, they are typically complicated and their effectiveness varies as motor operating conditions change. Generally, complicated math filters or observers are used to estimate critical motor parameters, such as, rotor resistance, rotor inductance, rotor electrical frequency, etc. As the result, the inaccuracy of estimations greatly effects the motor's performance. Thus they do not provide optimal dynamic motor control.

Therefore, there exists a need for a new and improved method and system for controlling an induction motor. The new and improved method and system should not depend on continuous position sensor feedback and various motor parameters, since these parameters vary with temperature, magnetic saturation, and motor wear. Further, the new and improved system should allow the motor to operate continuously in an optimized range, require minimum calibration, and accommodate for high motor parameter variation tolerance.

SUMMARY

A method for controlling an induction motor using an equivalent circuit model is provided. The equivalent circuit includes a real resistive component and an imaginary inductive component. The method avoids measuring or estimating individual induction motor parameters, instead, only a few operating parameters, such as phase voltages and phase currents are measured to determine a lump sum of the real and imaginary components of the induction motor impedance. Then, a first control function based on the real component of the induction motor impedance is calculated, a second control function based on the imaginary component of the induction motor impedance is calculated. Then, the induction motor excitation frequency is adjusted until the first control function is approximately equal to the second control function. Finally, the magnitude of the phase voltage is varied to achieve the desired motor/generator performance.

In an aspect of the present invention, determining the real component of the induction motor impedance includes calculating the real component of the induction motor impedance using the equation:

$$\text{Real}(Z_{in}) = (V_{ds} i_{ds} + V_{qs} i_{qs})/(i_{ds}^2 + i_{qs}^2).$$

In another aspect of the present invention, determining the imaginary component of the induction motor impedance includes calculating the imaginary component of the induction motor impedance using the equation:

$$\text{Im}(Z_{in})j = (V_{qs} i_{ds} - V_{ds} i_{qs})/(i_{ds}^2 + i_{qs}^2).$$

In still another aspect of the present invention, when the motor is used to convert electrical power to mechanical power, herein referred to as motoring mode, the first control function is calculated using the equation:

$$A' = K_m - A.$$

In still another aspect of the present invention, when motor is used to convert mechanical power to electrical power, herein referred to as generation mode, the first control function is calculated using the equation:

$$A' = K_g + A.$$

In still another aspect of the present invention, calculating a second control function further includes calculating using the following equation for both motoring and generation modes:

$$B' = B/(W_e K_o).$$

In still another aspect of the present invention, adjusting an induction motor operating parameter further includes adjusting an excitation frequency.

In still another aspect of the present invention, at the above determined stator excitation frequency, adjusting the amplitude of the voltage applied to motor results in the desired motor torque as described by the equation:

$$T_e = \frac{3P(\text{Real}(Z_{in}) - R_s)(V^2)}{W_e((\text{Real}(Z_{in}))^2 + (\text{Im}(Z_{in}))^2)} \tag{3}$$

These and other aspects and advantages of the present invention will become apparent upon reading the following detailed description of the invention in combination with the accompanying drawings.

DETAILED DESCRIPTION

The system and method of the present invention will be described and illustrated in a hybrid motor environment. Of course, it should not be construed that this is the only environment or application in which the present invention may be applied. On the contrary, the system and method of the present invention may be used in any application where an induction motor is implemented.

Figure 1:
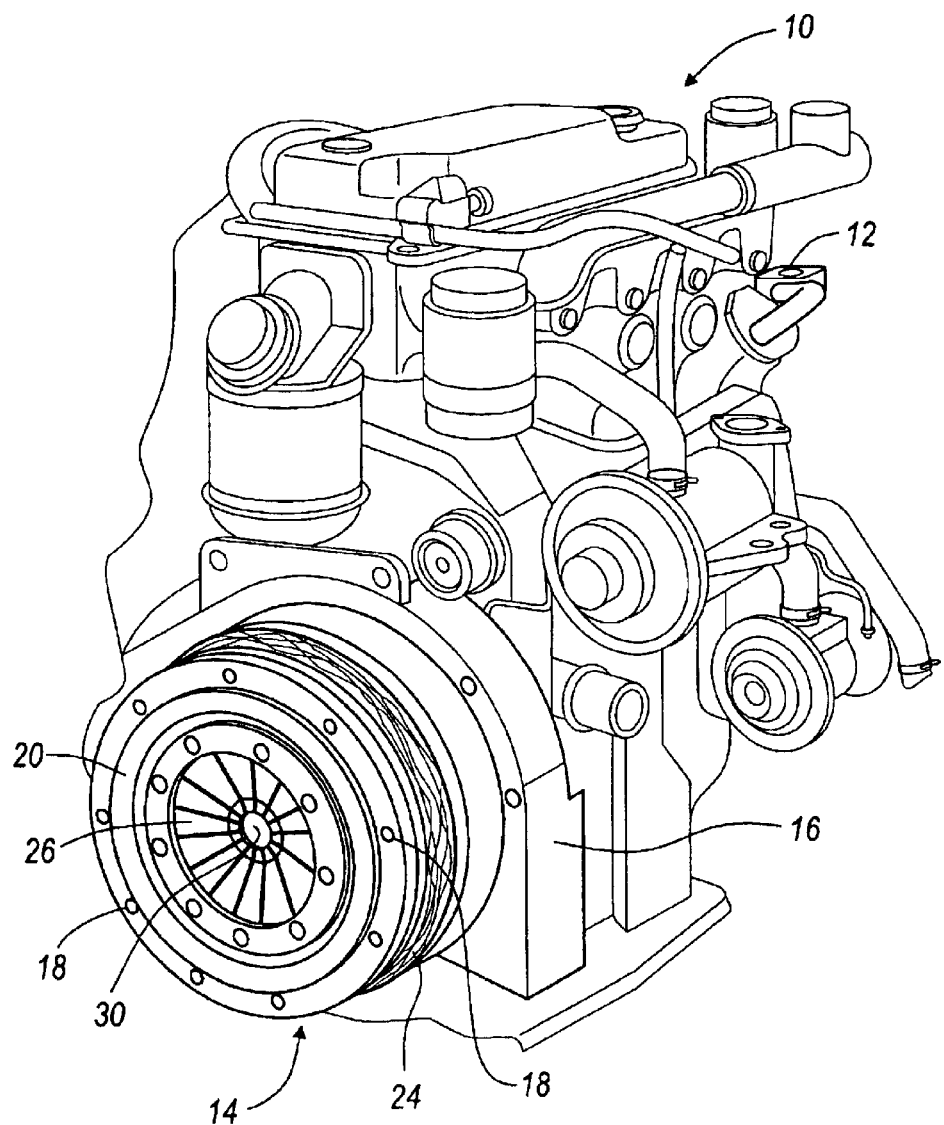
FIG. 1 is an illustration of an induction motor with an internal combustion engine forming a hybrid powerplant, in accordance with the present invention
Figure 2:
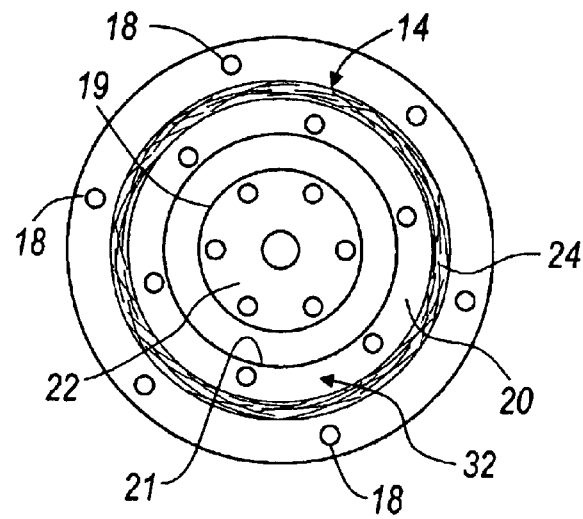
FIG. 2 is a schematic diagram illustrating an induction motor, in accordance with the present invention.

With reference to FIGS. 1 and 2, a perspective view of a hybrid automotive engine 10 is illustrated, in accordance with the present invention. Hybrid engine 10 preferably includes an internal combustion engine 12 mechanically coupled to an induction motor 14. More specifically, induction motor 14 is in rotational communication with the crankshaft of engine 12 and is preferably positioned between the engine block of engine 12 and the transmission. Induction motor 14 advantageously combines the functions of the starter and the alternator. Thus, many benefits and advantages are realized, such as seamless starting and stopping of engine 12, high efficiency electricity generation, and active damping of powertrain vibrations.

More specifically, induction motor 14 has a motor housing 16 which includes mounting features such as through apertures 18 for fixedly securing motor housing 16 to engine 12. Further, induction motor 14 has a stator 20 fixedly mounted to motor housing 16, and a rotor 22, rigidly coupled to the crankshaft (not shown) of engine 12. A stator winding 24 are disposed about stator 20. Rotor 22 is concentrically disposed within stator 20 and rotates with the engine's crankshaft (not shown). Additionally, an air gap 32 is defined by an outer surface 19 of rotor 22 and an inner surface 21 of stator 20.

A transmission (not shown) for transmitting drive torque to a vehicle's road wheels would be mounted to motor housing 16 and coupled through a driveshaft to a rotor gear spline 30 on rotor 22.

Induction motor 14 operates in at least two modes: a motoring mode, where electrical power is converted to mechanical power, and a generation mode where mechanical power is converted to electrical power. When induction motor 14 is operating in motoring mode, a three-phase alternating current is supplied to stator winding 24 directly and to rotor 22 by induction or a transformer action from the stator winding. The application of this poly-phase signal source to stator winding 24, produces a magnetic field in air gap 32 between rotor 22 and stator 20. The magnetic field rotates at a speed determined by the number of poles of stator 20 (a 12 pole machine is utilized in this invention) and the applied stator winding frequency ($W_e$). The rotor is made of a so-called squirrel cage rotor having windings consisting of conducting bars embedded in slots in the rotor iron and short circuited at each end by conducting end rings. The extreme simplicity and ruggedness of the squirrel cage construction are outstanding advantages of this type of induction motor.

The present invention provides a control strategy for controlling the operation of induction motor 14. The control strategy of the present invention provides sensorless control by measuring the impedance ($Z_{in}$) of induction motor 14 to calculate the proper stator winding frequency ($W_e$) and to achieve the required torque ($T_e$) to rotate the rotor 22 and thus the crankshaft of engine 12. The impedance and torque equations below illustrate how the control strategy of the present invention avoids reliance on critical motor parameters, that will change over varying operating conditions, as well as over the operating life of induction motor 14. Thus, the present invention provides robust motor control whereby the system continuously operates in an optimized torque or efficiency range regardless motor parameter variations.

Figure 3:
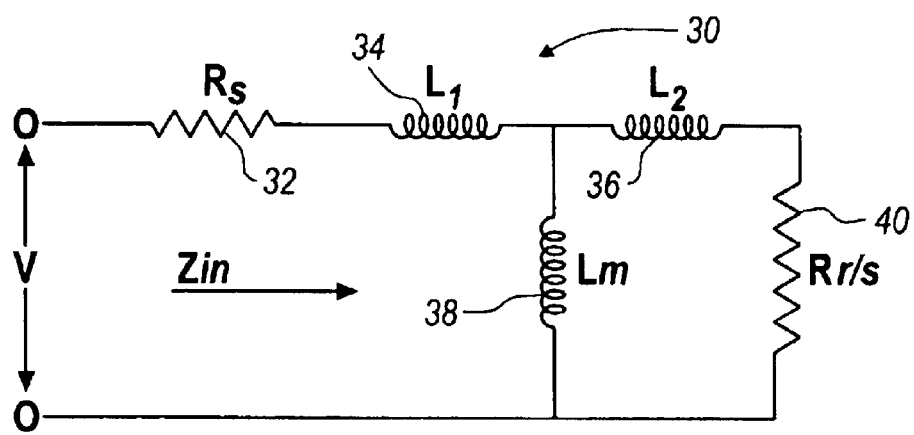
FIG. 3 is an equivalent electrical circuit model of the induction motor, in accordance with the present invention.

With reference to FIG. 3, an electrical equivalent circuit model 30 of induction motor 14 is illustrated. An impedance ($Z_{in}$) of motor 14 includes a stator resistance ($R_s$) 32, a stator leakage inductance ($L_1$) 34, a rotor leakage inductance ($L_2$) 36, a magnetizing inductance ($L_m$) 38 and a rotor resistance converted to stator side ($R_r/s$) 40. Furthermore, the impedance ($Z_{in}$) of motor 14 is comprised of real Real($Z_{in}$) and imaginary Im($Z_{in}$) components as shown in the equation (1) below:

$$Z_{in} = \text{Real}(Z_{in}) + Im(Z_{in})j \quad (1)$$

or $$Z_{in} = (R_s + [(R_r L_m^2 W_e W_{sl})/(R_r^2 + L_r^2 W_{sl}^2)]) + j(L_s W_e - [(L_m^2 L_r 2 W_{sl}^2)]) \quad (2)$$

The theoretical induction motor torque ($T_e$) is described by the following equation:

$$T_e = \frac{3PL_m^2(R_r/S)W_e(V^2)}{2[(R_s^2 + L_s^2 W_e^2)((R_r^2/S^2) + L_r^2 W_e^2) + L_m^2 W_e^2(2R_s(R_r/S) - 2L_s L_r W_e^2 + L_m^2 W_e^2)]}$$

By substituting Real($Z_{in}$) and Im($Z_{in}$), the torque equation is simplified to:

$$T_e = \frac{3P(\text{Real}(Z_{in}) - R_s)(V^2)}{W_e((\text{Real}(Z_{in}))^2 + (Im(Z_{in}))^2)} \quad (3)$$

Where:

$W_e$ = the excitation frequency;
$W_r$ = the rotor frequency;
$W_{sl} = W_e - W_r$ is the slip frequency;
V = Phase Voltage;
$R_s$ = the stator resistance;
$R_r$ = the rotor resistance;
$L_1$ = the leakage inductance of the stator;
$L_2$ the leakage inductance of the rotor;
$L_m$ = the magnetizing inductance;
$L_s = L_1 + L_m$ is the total stator inductance;
$L_r = L_2 + L_m$ is the total rotor inductance;
P = number of pole pairs of the motor;
$T_e$ = the electromagnetic torque;
$S = (W_e - W_r)/W_e$ is the slip;
$L_o = (L_s L_r - L_m^2)/L_r$ is the total leakage inductance; and
$\lambda_{dr} \& \lambda_{qr}$ are the flux linkages in the d-q frame.

The conventional induction motor (d-q) machine model as described in an article entitled "Control Development and Characterization of the Induction Machine Starter/Alternator Drive Module (IMSAM)", a Phase III Report for the Ford HEV Program, by Xu, et al, pages 1–7, hereby incorporated by reference is applied. Moreover, the stator current, rotor flux, and rotor frequency are used as the state variables and assuming steady state operation yields the following equations:

$$L_\sigma(di_{ds}/dt) = 0 = -(R_s + (L_m^2/L_r^2)R_r)i_{ds} + (L_\sigma W_e i_{qs}) + (L_m/T_r L_r)\lambda_{dr} + W_r(L_m/L_r)\lambda_{qr} + V_{ds} \quad (4)$$

$$L_\sigma(di_{qs}/dt) = 0 = -(R_s + (L_m^2/L_r^2)R_r)i_{qs} - (L_\sigma W_e i_{ds}) - W_r(L_m/L_r)\lambda_{dr} + (L_m/T_r L_r)\lambda_{qr} + V_{qs} \quad (5)$$

$$T_r(d\lambda_{dr}/dt) = 0 = L_m i_{ds} - \lambda_{dr} + T_r W_{sl}\lambda_{qr} \quad (6)$$

$$T_r(d\lambda_{qr}/dt) = 0 = L_m i_{qs} - \lambda_{qr} - T_r W_{sl}\lambda_{dr} \quad (7)$$

$$T_e(3PL_m)(\lambda_{dr}i_{qs} - \lambda_{qr}i_{ds})/(2L_r) \quad (8)$$

Solving Equations (6) and (7) for Xdr and Xqr yields the following:

$$\lambda_{dr} = (L_m i_{ds} + T_r W_{sl}L_m i_{qs})/(1 + T_r^2 W_{sl}^2) \quad (9)$$

$$\lambda_{qr} = (L_m i_{qs} - T_r W_{sl}L_m i_{ds})/(1 + T_r^2 W_{sl}^2) \quad (10)$$

Also: $T_r = L_r/R_r$ (11)

$W_r = W_e - W_{sl}$ (12)

Substituting into Equations (9)–(12) into Equations (4) and (5):

$$0 = -(R_s + [(R_r L_m^2 W_e W_{sl})/(R_r^2 + L_r^2 W_{sl}^2)])i_{ds} + (L_s W_e - [(L_m^2 L_r W_e W_{sl}^2)/(R_r^s + L_r^2 W_{sl}^2)])i_{qs} + V_{ds} \quad (13)$$

$$0 = -(L_s W_e - [(L_m^2 L_r W_e W_{sl}^2)/(R_r^2 + L_r^2 W_{sl}^2)])i_{ds} - (R_s + [(R_r L_m^2 W_e W_{sl})/(R_r^2 + L_r^2 W_{sl}^2)])i_{qs} + V_{qs} \quad (14)$$

Let: $A = (R_s + [(R_r L_m^2 W_e W_{sl})/(R_r^2 + L_r^2 W_{sl}^2)])$ (15)

$B = (L_s W_e - [(L_m^2 L_r W_e W_{sl}^2)/(R_r^2 + L_r^2 W_{sl}^2)])$ (16)

Then Equations (13) and (14) become:

$V_{ds} = (A)i_{ds} - (B)i_{qs}$ (17)

$V_{qs} = (B)i_{ds} - (A)i_{qs}$ (18)

And: $A = (V_{ds}i_{ds} + V_{qs}i_{qs})/(i_{ds}^2 + i_{qs}^2)$ (19)

$B = (V_{qs}i_{ds} - V_{ds}i_{qs})/(i_{ds}^2 + i_{qs}^2)$ (20)

Substituting Equations (15) and (16) into (2) suggests:

$A \rightarrow \text{Real}(Z_{in}) = (V_{ds}i_{ds} + V_{qs}i_{qs})/(i_{ds}^2 + i_{qs}^2)$ (21)

$B \rightarrow \text{Im}(Z_{in})j = (V_{qs}i_{ds} - V_{ds}i_{qs})/(i_{ds}^2 + i_{qs}^2)$ (22)

Since $V_{ds}$, $V_{qs}$ are controlled parameters, $1_{qs}$, $1_{ds}$ are the motor phase currents converted to d-q frame, the motor impedance is calculated without using individual motor parameters, such as $R_s$, $L_s$, $R_r$, $L_r$ and Slip. Since the variation of motor parameters affects motor phase voltage and phase current, the impedance calculated in (21) and (22) represents the actual motor operation condition and the effect of parameter changes due to motor speed, temperature change, and magnetic saturation are also included.

Figure 4A:
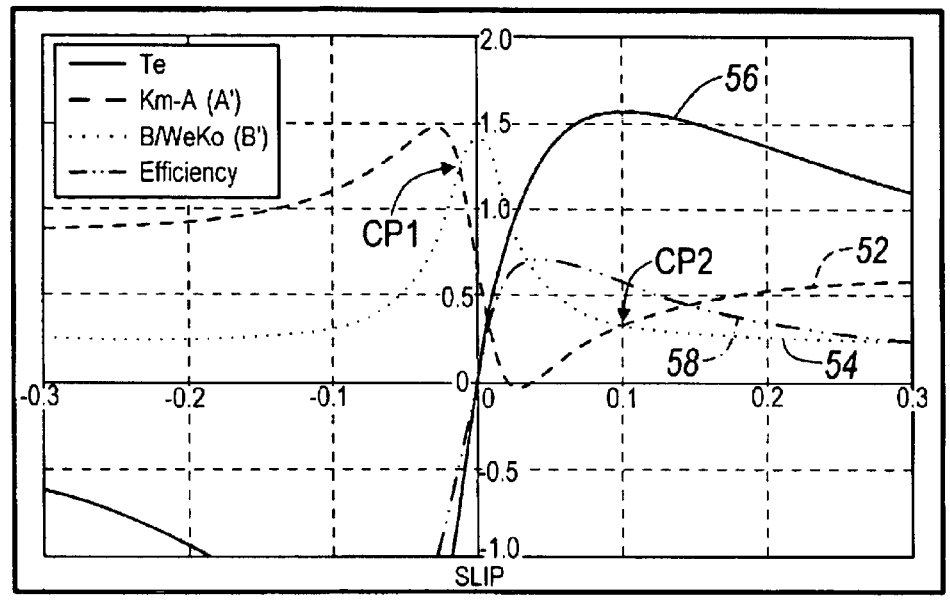
FIGS. 4a and 4b are graphs illustrating a torque output curve, efficiency curve and respective induction motor control signals, wherein the motor is operating in motoring mode at an optimum state, in accordance with the present invention.
Figure 4B:
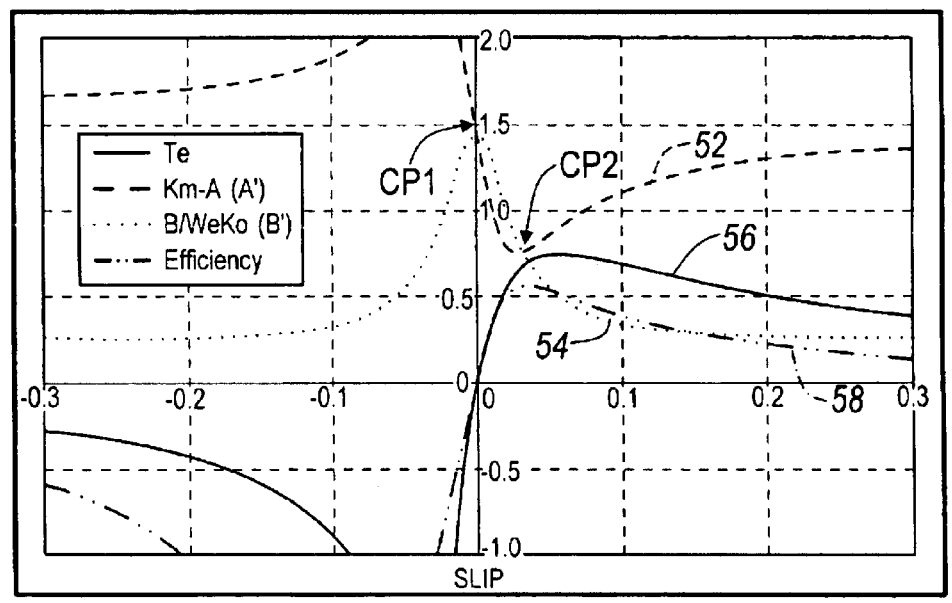

With reference to FIGS. 4a and 4b, a plot of induction motor control signals or functions 52, 54 are illustrated for motoring mode operation. More specifically, FIG. 4a illustrates how $K_m$ may be adjusted to achieve maximum torque. While FIG. 4b illustrates how $K_m$ may be adjusted to achieve maximum efficiency as represented by efficiency curve 58. In motor motoring mode, the control signals or functions 52 and 54 are defined by equations (23a) and (24) below:

$A' = K_m - A$ (23a)

$B = B/(W_e K_o)$ (24)

Where $K_m$ is a motor performance control constant, introduced purposely to cause the motor to operate in the desired range, such as optimized torque generation or maximum efficiency, and $K_o$ is a unit conversion constant used to optimize motor control as will be discussed hereinafter. Control signal 52, as indicated by equation (23a), is derived from the real part of induction motor impedance ($Z_{in}$). Induction motor control signal 54, as indicated by equation (24), is derived from the imaginary part of the induction motor impedance ($Z_{in}$). The stator winding excitation frequency $W_e$, is controlled so that control function 52 approximately equals control function 54, thus allowing the motor to operate in the desired operating range (i.e. maximum torque output or maximum efficiency).

The torque generated by induction motor 14 is shown in FIGS. 4a and 4b and is represented by reference numeral 56. Control signals 52 and 54 cross at two points, namely CP1 and CP2. As is clear from FIGS. 4a and 4b, crossing point CP1 does not correspond with a desired torque output (maximum torque) or maximum efficiency of induction motor 14. Accordingly, CP1 is not used to judge whether the motor is in a desirable operating range. Further, $K_m$ is adjusted such that CP2 corresponds with the maximum output torque of induction motor 14 or peak efficiency which depends on motor operating requirements. There always exists a relationship between CP2 and the maximum torque point over the motor excitation speed range.

By evaluating the magnitude of motor impedance $|Z_{in}|$ or $|I_{ds}^2 + 1_{qs}^2|/(V_{ds}^2 + V_{qs}^2)$ and the polarity of torque ($T_e$), the difference between crossing point CP1 and CP2 is easily distinguishable. Whereby only crossing point CP2 is selected to achieve sensorless motor control.

Figure 4C:
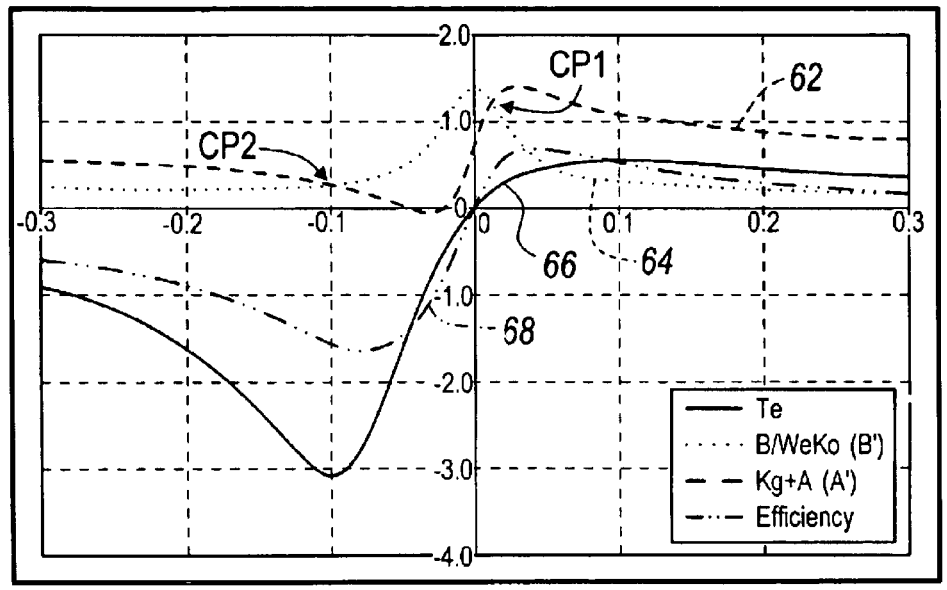
FIGS. 4c and 4d are graphs illustrating a torque output curve, efficiency curve and respective induction motor control signals, wherein the motor is operating in generating mode at an optimum state, in accordance with the present invention.
Figure 4D:
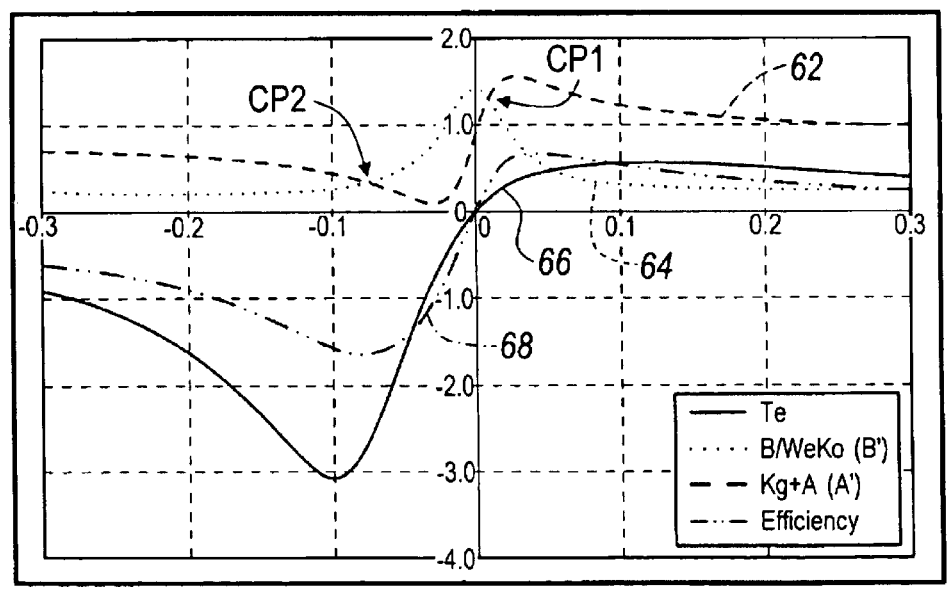

With reference to FIGS. 4c and 4d, a plot of induction motor control signals or functions 62, 64 are illustrated in generating mode. More specifically, FIG. 4c illustrates how $K_g$ may be adjusted to achieve maximum torque. While FIG. 4d illustrates how $K_g$ may be adjusted to achieve maximum efficiency as represented by efficiency curve 68. In motor generation mode, the control signals or functions 62 and 64 are defined by equations (23b) and (24) below:

$A' = K_g + A$. (23b)

$B' = B/(W_e K_o)$ (24)

Where $K_g$ is a motor performance control constant, introduced purposely to cause the motor to operate in the desired range, such as optimized torque generation or maximum efficiency, and $K_o$ is a unit conversion constant used to optimize motor control, as will be discussed hereinafter. Control signal 62, as indicated by equation (23b), is derived from the real part of induction motor impedance ($Z_{in}$). Induction motor control signal 64, as indicated by equation (24), is derived from the imaginary part of the induction motor impedance ($Z_{in}$). The stator winding excitation frequency $W_e$, is controlled so that control function 62 approximately equals control function 64, thus allowing the motor to operate in the desired operating range (i.e. maximum torque output or maximum efficiency).

The torque generated by induction motor 14 is shown in FIGS. 4c and 4d and is represented by reference numeral 66. Control signals 62 and 64 cross at two points, namely CP1 and CP2. As is clear from FIGS. 4c and 4d, crossing point CP1 does not correspond with a desired torque output (maximum torque) or maximum efficiency of induction motor 14. Accordingly, CP1 is not used to judge whether the motor is in a desirable operating range. Further, $K_g$ is adjusted such that CP2 corresponds with the maximum output torque of induction motor 14 or peak efficiency which depends on motor operating requirements. There always exists a relationship between CP2 and the maximum torque point over the motor excitation speed range.

By evaluating the magnitude of motor impedance $|Z_{in}|$ or $|I_{ds}^2+I_{qs}^2|/(V_{ds}^2+V_{qs}^2)$ and the polarity of torque ($T_e$), the difference between crossing point CP1 and CP2 is easily distinguishable. Whereby only crossing point CP2 is selected to achieve sensorless motor control.

Therefore, the sensorless induction motor control of the present invention is achieved by: adjusting the stator frequency $W_e$ until equation (23a) or (23b) equals equation (24) and by varying $V_{ds}$ and $V_{qs}$ in equation (3) to control the magnitude of the motor torque.

Figure 5:
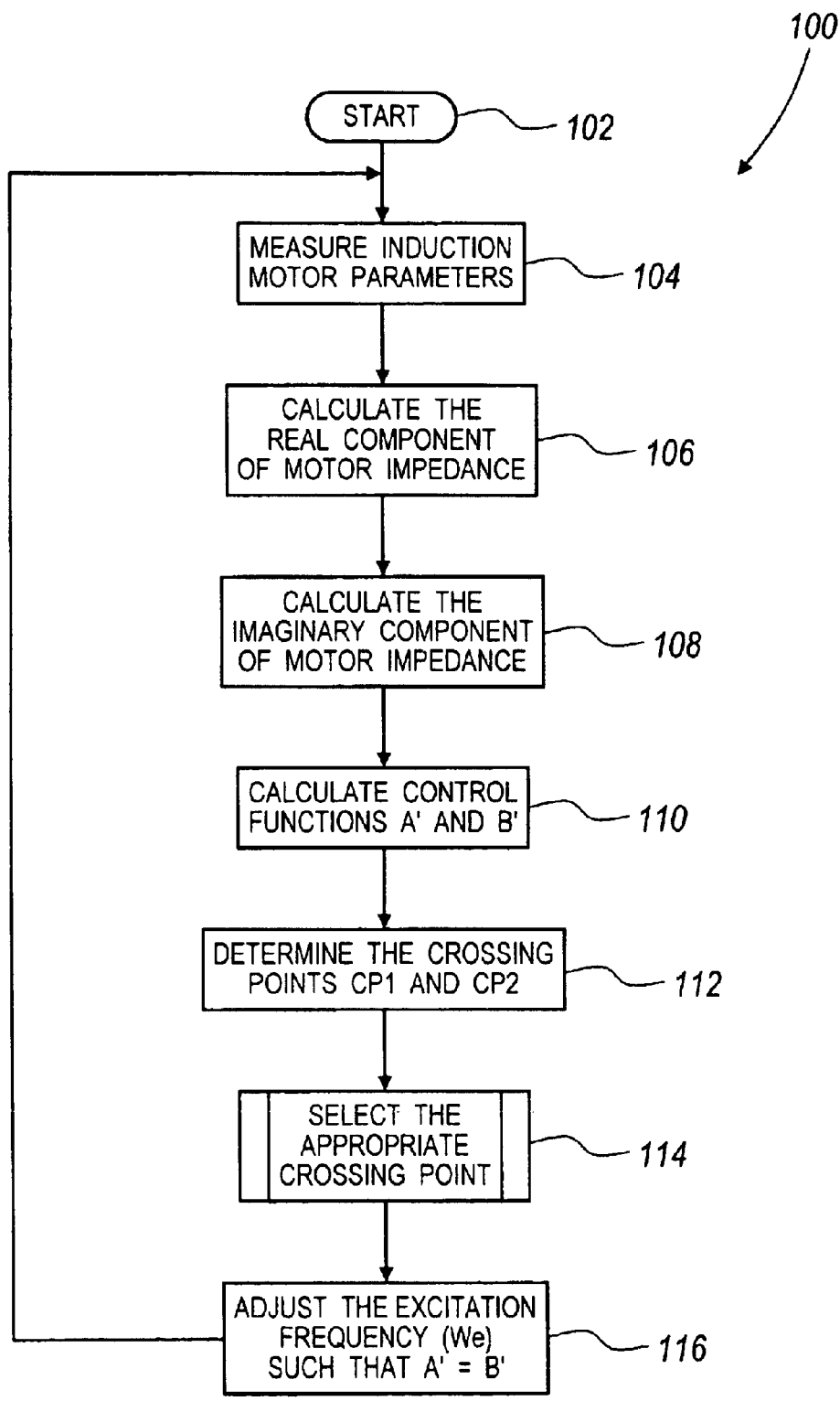
FIG. 5 is a flowchart of a control strategy for controlling the operation of an induction motor, in accordance with the present invention.

Referring now to FIG. 5, a flow chart illustrating an induction motor control strategy is illustrated, in accordance with the present invention. Control strategy 100 is initiated at block 102, and at block 104 induction motor phase currents and phase voltages are directly measured and converted to the d-q reference frame. At block 106, the real component of the motor impedance is calculated. The imaginary component of the motor impedance is calculated at block 108. At block 110, control functions A' and B' are calculated according to the mode the motor is operating in, whereby A' is determined by (23) or (23a). The control function B' is calculated by taking the imaginary component of the induction motor impedance and dividing by the product of the excitation frequency ($W_e$) and a unit conversion constant ($K_o$). Next, the difference of the control functions A' and B' are calculated, at block 112. At block 114 a selection of the correct crossing point (CP2) is made. At block 116, the excitation frequency (We) is adjusted until the control function A' approximately equals the control function B'. In practice however, the excitation frequency will be adjusted so that control function A' is approximately equal to control function B' within a predefined and specified range. With $W_e$ selected, the motor torque may then be calculated from (3) where $V_{ds}$ and $V_{qs}$ are the inputs.

Thus, the present invention provides a sensorless induction motor control with voltages in the d-q frame as the only inputs for achieving the desired motor performance. Instead of employing individual motor parameters, the aforementioned sensorless induction motor control strategy relies on measuring motor phase voltage and phase current, and the continuous calculation of control functions (23a), (23b), and (24), accounting for operating condition changes, temperature changes, magnetic saturation, and motor wear.

The present invention has many advantages and benefits over the prior art. For example, the impedance and torque equations described above illustrate how the control strategy of the present invention avoids reliance on critical motor parameters, that will change over varying operating conditions, as well as over the life of induction motor 14. Still, the control parameters, $K_m$, $K_g$, and $K_o$ provide an easy means for adjusting motor operation in the desired operation range. Thus, the present invention provides a robust motor control whereby the system continuously searches for the optimized torque/efficiency range to operate the motor.

What is claimed is:

1. A method for controlling an induction motor having a stator and a rotor, wherein an equivalent circuit model is utilized to model the electrical characteristics of the induction motor, the equivalent circuit includes a real component and an imaginary component, the method comprising:

directly measuring motor phase currents and voltages;

determining the real component of the induction motor impedance;

determining the imaginary component of the induction motor impedance;

calculating a first control function based on the real component of the induction motor impedance;

calculating a second control function based on the imaginary component of the induction motor impedance;

choosing a stator winding excitation frequency that causes the first control function to approximately equal the second control function; and adjusting an amplitude of a stator winding voltage at the chosen stator winding excitation frequency to produce a desired induction motor output torque.

2. The method of claim 1 wherein calculating a first control function further includes calculating the first control function when the induction motor is in a motoring mode using the equation:

$$A'=K_m-A$$

Where: $A=(R_a+[(R_rL_m^2W_eW_{sl})/(R_r^2+L_r^2W_{sl}^2)])$
$W_e$=a stator winding excitation frequency;
$W_r$=a rotor frequency;
$W_{sl}=W_eW_r$ is the slip frequency between the stator and rotor;
$R_s$=a stator winding resistance;
$R_r$=a rotor resistance;
$L_1$=a leakage inductance of the stator;
$L_2$=a leakage inductance of the rotor;
$L_m$=a magnetizing inductance of the inductance motor;
$L_r=L_2+L_m$ is the total rotor inductance; and
$K_m$=a motor performance control constant.

3. The method of claim 2 further comprising adjusting $K_m$ to achieve a desired operating condition wherein the desired operating condition is one of a maximum induction motor output torque and a maximum induction motor operating efficiency when the first control function and the second control function are approximately equal.

4. The method of claim 1 wherein calculating a first control function further includes calculating the first control function when the induction motor is in a generating mode using the equation:

$$A'=K_g+A$$

Where: $A=(R_a+[(R_rL_m^2W_eW_{sl})/(R_r^2+L_r^2W_{sl}^2)])$
$W_e$=a stator winding excitation frequency;
$W_r$=a rotor frequency;
$W_{sl}=W_eW_r$ is the slip frequency between the stator and rotor;
$R_s$=a stator winding resistance;
$R_r$=a rotor resistance;
$L_1$=a leakage inductance of the stator;
$L_2$=a leakage inductance of the rotor;

$L_m$=a magnetizing inductance of the inductance motor;
$L_r=L_2+L_m$ is the total rotor inductance; and
$k_o$=a motor performance control constant.

5. The method of claim 4 further comprising adjusting $K_g$ to achieve a desired operating condition, wherein the desired operating condition is one of a maximum induction motor output torque and a maximum induction motor operating efficiency when the first control function and the second control function are approximately equal.

6. The method of claim 1 wherein calculating a second control function further includes calculating the first control function using the equation:

$$B'=B/(W_e K_o)$$

Where: $B=(L_s W_e-[(L_m^2 L_r W_e w_{sl}^2)/(R_r^2+L_r^2 W_{sl}^2)])$
$W_e$=a stator winding excitation frequency;
$W_r$=a rotor frequency;
$W_{sl}=W_e$ is a slip frequency between the stator and rotor;
$R_r$=a rotor resistance;
$L_1$=a leakage inductance of the stator;
$L_2$=a leakage inductance of the rotor;
$L_m$=a magnetizing inductance of the inductance motor;
$L_s=L_1+L_m$ is the total stator inductance;
$L_r=L_2+L_m$ is the total rotor inductance; and
$K_o$=a unit conversion constant.

7. The method of claim 1 wherein adjusting an induction motor operating parameter further includes adjusting an excitation frequency.

8. The method of claim 1 wherein adjusting torque includes adjust the motor phase voltage only.

9. A method for controlling an induction motor, the induction motor having a stator and a rotor, wherein the stator is includes a stator winding for inducing a magnetic field in a gap between the stator and the rotor when an excitation signal is applied to the stator winding, the induction motor being described by an impedance model, the impedance model having a real component and an imaginary component, the method comprising:
determining the real component of the induction motor impedance based on the plurality of induction motor parameters;
determining the imaginary component of the induction motor impedance based on the plurality of induction motor parameters;
calculating a first control function based on the real component of the induction motor impedance and a motor performance control constant;
calculating a second control function based on the imaginary component of the induction motor impedance and a stator winding excitation frequency;
choosing the stator winding excitation frequency that causes the first control function to approximately equal the second control function; and
adjusting an amplitude of a stator winding voltage at the chosen stator winding excitation frequency to produce a desired induction motor output torque.

10. The method of claim 9 wherein measuring a plurality of induction motor parameters includes measuring an excitation frequency, a rotor frequency, a stator resistance, a rotor resistance, a stator leakage inductance, a rotor leakage inductance, and a magnetizing inductance.

11. The method of claim 9 wherein calculating a first control function further includes calculating the first control function when the induction motor is in a motoring mode using the equation:

$$A'=K_m-A$$

Where: $A=(R_s+[(R_r L_m^2 W_e w_{sl})/(R_r^2+L_r^2 W_{sl}^2)])$
$W_e$=a stator winding excitation frequency;
$W_r$=a rotor frequency;
$W_{sl}=W_e W_r$ is the slip frequency between the stator and rotor;
$R_s$=a stator winding resistance;
$R_r$=a rotor resistance;
$L_1$=a leakage inductance of the stator;
$L_2$=a leakage inductance of the rotor;
$L_m$=a magnetizing inductance of the inductance motor;
$L_r=L_2+L_m$ is the total rotor inductance; and
$K_m$=a motor performance control constant.

12. The method of claim 11 further comprising adjusting $K_m$ to achieve one of a maximum induction motor output torque and a maximum induction motor operating efficiency when the first control function and the second control function are approximately equal.

13. The method of claim 9 wherein calculating a first control function further includes calculating the first control function when the induction motor is in a generating mode using the equation:

$$A'=K_g+A$$

Where: $A=(R_s+[(R_r L_m^2 W_e w_{sl})/(R_r^2+L_r^2 W_{sl}^2)])$
$W_e$=a stator winding excitation frequency;
$W_r$=a rotor frequency;
$W_{sl}=W_e W_r$ is the slip frequency between the stator and rotor;
$R_s$=a stator winding resistance;
$R_r$=a rotor resistance;
$L_1$=a leakage inductance of the stator;
$L_2$=a leakage inductance of the rotor;
$L_m$=a magnetizing inductance of the inductance motor;
$L_r=L_2+L_m$ is the total rotor inductance; and
$K_g$=a motor performance control constant.

14. The method of claim 13 further comprising adjusting $K_g$ to achieve one of a maximum induction motor output torque and a maximum induction motor operating efficiency when the first control function and the second control function are approximately equal.

15. The method of claim 9 wherein calculating a second control function further includes calculating the first control function using the equation:

$$B'=B/(W_e K_o)$$

Where: $B=(L_s W_e-[(L_m^2 L_r W_e W_{sl}^2)/(R_r^2+L_r^2 W_{sl}^2)])$
$W_e$=a stator winding excitation frequency;
$W_r$=a rotor frequency;
$W_{sl}=W_e$ is a slip frequency between the stator and rotor;
$R_r$=a rotor resistance;
$L_1$=a leakage inductance of the stator;
$L_2$=a leakage inductance of the rotor;
$L_m$=a magnetizing inductance of the inductance motor;
$L_s=L_1+L_m$ is the total stator inductance;
$L_r=L_2+L_m$ is the total rotor inductance; and
$K_o$=a unit conversion constant.

16. The method of claim 9 wherein adjusting an induction motor operating parameter further includes adjusting an excitation frequency.

17. A method for controlling an induction motor, the induction motor having a stator and a rotor, wherein the stator is surrounded by a stator winding for inducing a magnetic field in a gap between the stator and the rotor when an excitation frequency is applied to the stator winding, the induction motor being described by an impedance model, the impedance model includes a real component and an imaginary component, the method comprising:

measuring a plurality of induction motor parameters;

determining the real component of the induction motor impedance based on the plurality of induction motor parameters;

determining the imaginary component of the induction motor impedance based on the plurality of induction motor parameters;

calculating a first control function based on the real component of the induction motor impedance and a motor performance control constant;

calculating a second control function based on the imaginary component of the induction motor impedance and an excitation frequency;

adjusting the excitation frequency until the first control function is approximately equal to the second control function.

18. The method of claim 17 wherein measuring a plurality of induction motor parameters includes measuring an excitation frequency, a rotor frequency, a stator resistance, a rotor resistance, a stator leakage inductance, a rotor leakage inductance, and a magnetizing inductance.

19. The method of claim 15 wherein calculating a first control function further includes calculating the first control function when the induction motor is in a motoring mode using the equation:

$$A' = K_m - A$$

Where: $A = (R_s + [(R_r L_m^2 W_e W_{sl})/(R_r^2 + L_r^2 W_{sl}^2)])$
  $W_e$ = a stator winding excitation frequency;
  $W_r$ = a rotor frequency;
  $W_{sl} = W_e W_r$ is the slip frequency between the stator and rotor;
  $R_s$ = a stator winding resistance;
  $R_r$ = a rotor resistance;
  $L_1$ = a leakage inductance of the stator;
  $L_2$ = a leakage inductance of the rotor;
  $L_m$ = a magnetizing inductance of the inductance motor;
  $L_r = L_2 + L_m$ is the total rotor inductance; and
  $K_m$ = a motor performance control constant.

20. The method of claim 19 further comprising adjusting $K_m$ to achieve one of a maximum induction motor output torque and a maximum induction motor operating efficiency when the first control function and the second control function are approximately equal.

21. The method of claim 17 wherein calculating a first control function further includes calculating the first control function when the induction motor is in a generating mode using the equation:

$$A' = K_g + A$$

Wherein: $A = (R_s + [(R_r L_m^2 W_e W_{sl})/(R_r^2 + L_r^2 W_{sl}^2)])$
  $W_e$ = a stator winding excitation frequency;
  $W_r$ = a rotor frequency;
  $W_{sl} = W_e W_r$ is the slip frequency between the stator and rotor;
  $R_s$ = a stator winding resistance;
  $R_r$ = a rotor resistance;
  $L_1$ = a leakage inductance of the stator;
  $L_2$ = a leakage inductance of the rotor;
  $L_m$ = a magnetizing inductance of the inductance motor;
  $L_r = L_2 + L_m$ is the total rotor inductance; and
  $K_g$ = a motor performance control constant.

22. The method of claim 21 further comprising adjusting $K_g$ to achieve one of a maximum induction motor output torque and a maximum induction motor operating efficiency when the first control function and the second control function are approximately equal.

23. The method of claim 17 wherein calculating a second control function further includes calculating the second control function using the equation:

$$B' = B/(W_e K_o)$$

Where: $B = (L_s W_e - [(L_m^2 L_r W_e W_{sl}^2)/(R_r^2 + L_r^2 W_{sl}^2)])$
  $W_e$ = a stator winding excitation frequency;
  $W_r$ = a rotor frequency;
  $W_{sl} = W_e$ is a slip frequency between the stator and rotor;
  $R_r$ = a rotor resistance;
  $L_1$ = a leakage inductance of the stator;
  $L_2$ = a leakage inductance of the rotor;
  $L_m$ = a magnetizing inductance of the inductance motor;
  $L_s = L_1 + L_m$ is the total stator inductance;
  $L_r = L_2 + L_m$ is the total rotor inductance; and
  $K_o$ = a unit conversion constant.

* * * * *